(12) United States Patent
Mizoi

(10) Patent No.: US 12,099,763 B2
(45) Date of Patent: Sep. 24, 2024

(54) PRINTING SYSTEM TO PRINT POP DATA, PRINTING CONTROL APPARATUS, CONTROL METHOD FOR PRINTING CONTROL APPARATUS, AND STORAGE MEDIUM

(71) Applicant: CANON KABUSHIKI KAISHA, Tokyo (JP)

(72) Inventor: Daiki Mizoi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/158,374

(22) Filed: Jan. 23, 2023

(65) Prior Publication Data

US 2023/0236779 A1  Jul. 27, 2023

(30) Foreign Application Priority Data

Jan. 27, 2022  (JP) .................................. 2022-010583

(51) Int. Cl.
  *G06F 3/12*  (2006.01)
  *G06F 3/0482*  (2013.01)
  *G06F 3/14*  (2006.01)

(52) U.S. Cl.
  CPC .......... *G06F 3/1243* (2013.01); *G06F 3/0482* (2013.01); *G06F 3/1204* (2013.01); *G06F 3/1254* (2013.01); *G06F 3/14* (2013.01)

(58) Field of Classification Search
  CPC .... G06F 3/1243; G06F 3/1204; G06F 3/1253; G06F 3/1256
  USPC ......................................................... 358/1.15
  See application file for complete search history.

(56) References Cited

U.S. PATENT DOCUMENTS

2013/0262263 A1* 10/2013 Watanabe .......... G06Q 30/0633
                                                       705/26.8
2023/0289120 A1*  9/2023 Morita .................. G06F 3/1285

FOREIGN PATENT DOCUMENTS

JP          2008033635 A     2/2008

\* cited by examiner

*Primary Examiner* — Kent Yip
(74) *Attorney, Agent, or Firm* — Canon U.S.A., Inc. IP Division

(57) ABSTRACT

A printing system including a server apparatus and a printing control apparatus includes a registration unit configured to register image data, a plurality of pieces of data to be combined with the image data, and categories corresponding to the plurality of pieces of data, respectively, in the server apparatus, a selection unit configured to select at least one category from the categories registered in the server apparatus, a display control unit configured to display the plurality of pieces of data registered by the registration unit based on the at least one category selected by the selection unit, and a printing unit configured to print data by combining data selected by a user from among the plurality of pieces of displayed data with the image data.

9 Claims, 14 Drawing Sheets

FIG.2

200 POP DATA

201 PROJECT DATA TABLE

| PROJECT ID | PROJECT NAME | TERM | FRAME DATA ID |
|---|---|---|---|
| 1 | MONTH-END FAIR | 1/20 - 1/30 | 1 |
| 2 | ITALIAN FAIR | 3/10 - 3/14 | 2 |
| 3 | HALLOWEEN SALE | 10/15 - 10/31 | 3 |
| 4 | GIVING-BACK SALE | 12/10 - 12/20 | 1 |

202 VARIABLE DATA TABLE

| ARTICLE ID | ARTICLE NAME | CATEGORY ID | PRICE | PROJECT ID | PRINT STATUS |
|---|---|---|---|---|---|
| 1 | CABBAGE | 3 | 178 YEN | 1 | NOT PRINTED |
| 2 | TOMATO | 3 | 258 YEN | 1 | NOT PRINTED |
| 3 | ORANGE JUICE | 1 | 128 YEN | 1 | NOT PRINTED |
| 4 | SODA WATER | 1 | 98 YEN | 1 | NOT PRINTED |
| 5 | NATURAL WATER | 1 | 78 YEN | 1 | NOT PRINTED |
| 6 | WINE | 3 | 498 YEN | 2 | NOT PRINTED |
| 7 | SQUASH | 3 | 198 YEN | 3 | NOT PRINTED |
| 8 | SODA WATER | 1 | 98 YEN | 4 | NOT PRINTED |
| 9 | NATURAL WATER | 1 | 78 YEN | 4 | NOT PRINTED |

203 FRAME DATA TABLE

| FRAME DATA ID | FRAME NAME | FRAME DATA |
|---|---|---|
| 1 | ADVERTISED ITEM | xxx/xxx.jpg |
| 2 | ITALIAN | yyy/yyy.jpg |
| 3 | HALLOWEEN | zzz/zzz.jpg |

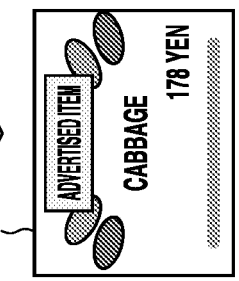

204

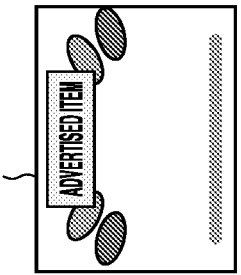

*300* CATEGORY DATA TABLE

| CATEGORY ID | CATEGORY NAME |
|---|---|
| 1 | BEVERAGE |
| 2 | CONFECTIONERY |
| 3 | VEGETABLE |
| 4 | SEASONING |
| 5 | BREAD |
| 6 | FROZEN FOOD |
| 7 | FAVORITE ITEM |

FIG.7A

LOGIN INFORMATION REGISTRATION SCREEN

| DATA SERVER URL | http://xxx/yyy/zzz | — 701 |
| STORE ID | 1234 | — 702 |
| PASSWORD | ●●● | — 703 |

REGISTER — 704

CATEGORY INFORMATION REGISTRATION SCREEN

706 —

| BEVERAGE | ✓ |
| CONFECTIONERY | |
| VEGETABLE | |
| SEASONING | |
| BREAD | |
| FROZEN FOOD | |
| FAVORITE ITEM | |

— 707

REGISTER — 708

705

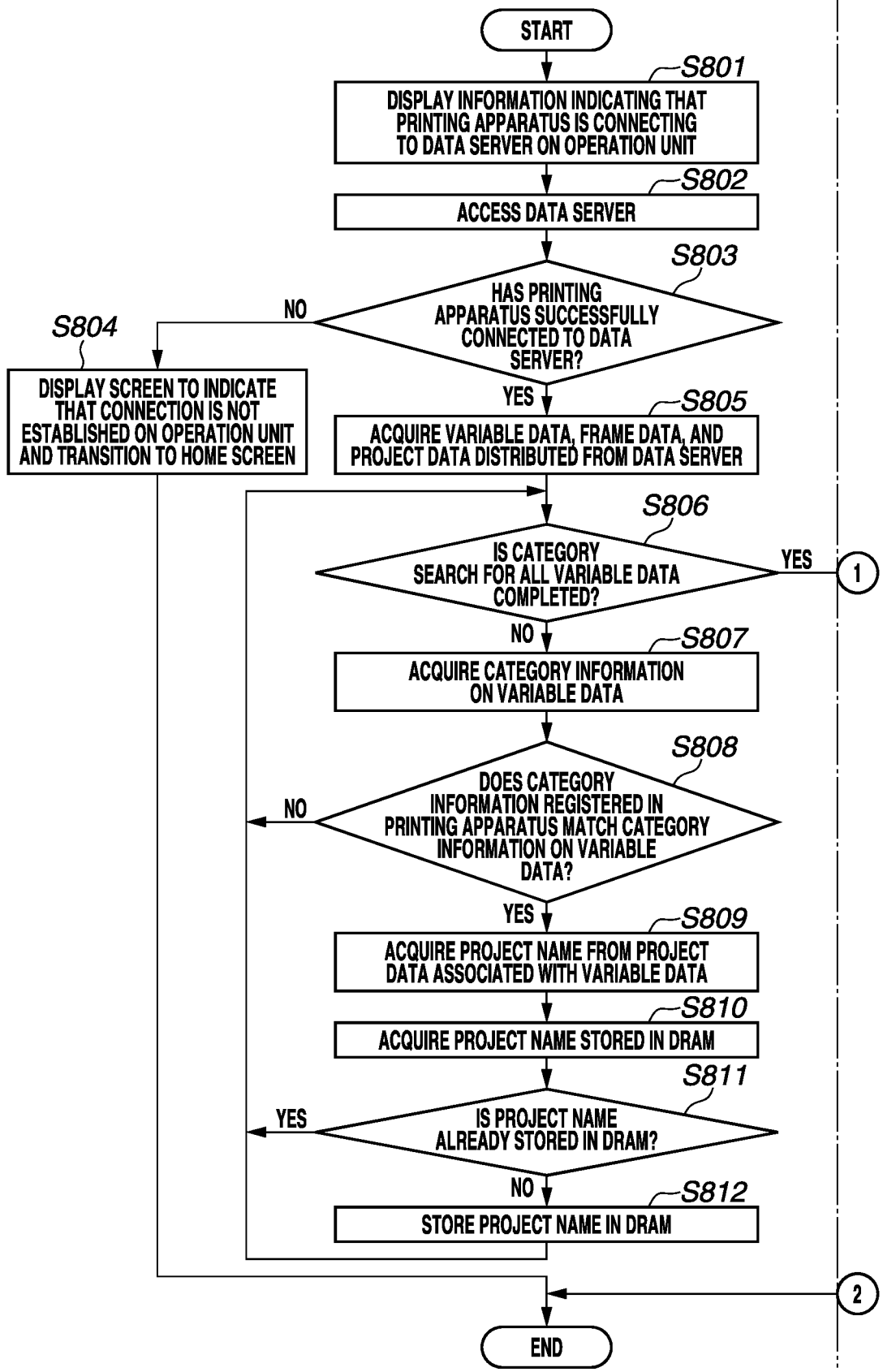

POPPrint

| NOT PRINTED | PRINTED |
|---|---|

| ☐ | CABBAGE | 178 YEN | EDIT |
| ☐ | TOMATO | 238 YEN | EDIT |

PRINT

919

POPPrint

| NOT PRINTED | PRINTED |
|---|---|

| ☐ | ORANGE JUICE | 120 YEN | EDIT |
| ☐ | SODA WATER | 98 YEN | EDIT |
| ☐ | NATURAL WATER | 80 YEN | EDIT |

PRINT

920 910

POPPrint

909 — | NOT PRINTED | PRINTED | OTHER | — 921

| ☑ | ORANGE JUICE | 120 YEN | EDIT | — 912
| ☑ | SODA WATER | 98 YEN | EDIT |
| ☑ | NATURAL WATER | 80 YEN | EDIT |

911

PRINT — 913

922

POPPrint

| NOT PRINTED | PRINTED | OTHER |
|---|---|---|

| ☐ | CABBAGE | 178 YEN | EDIT |
| ☐ | TOMATO | 238 YEN | EDIT |

PRINT

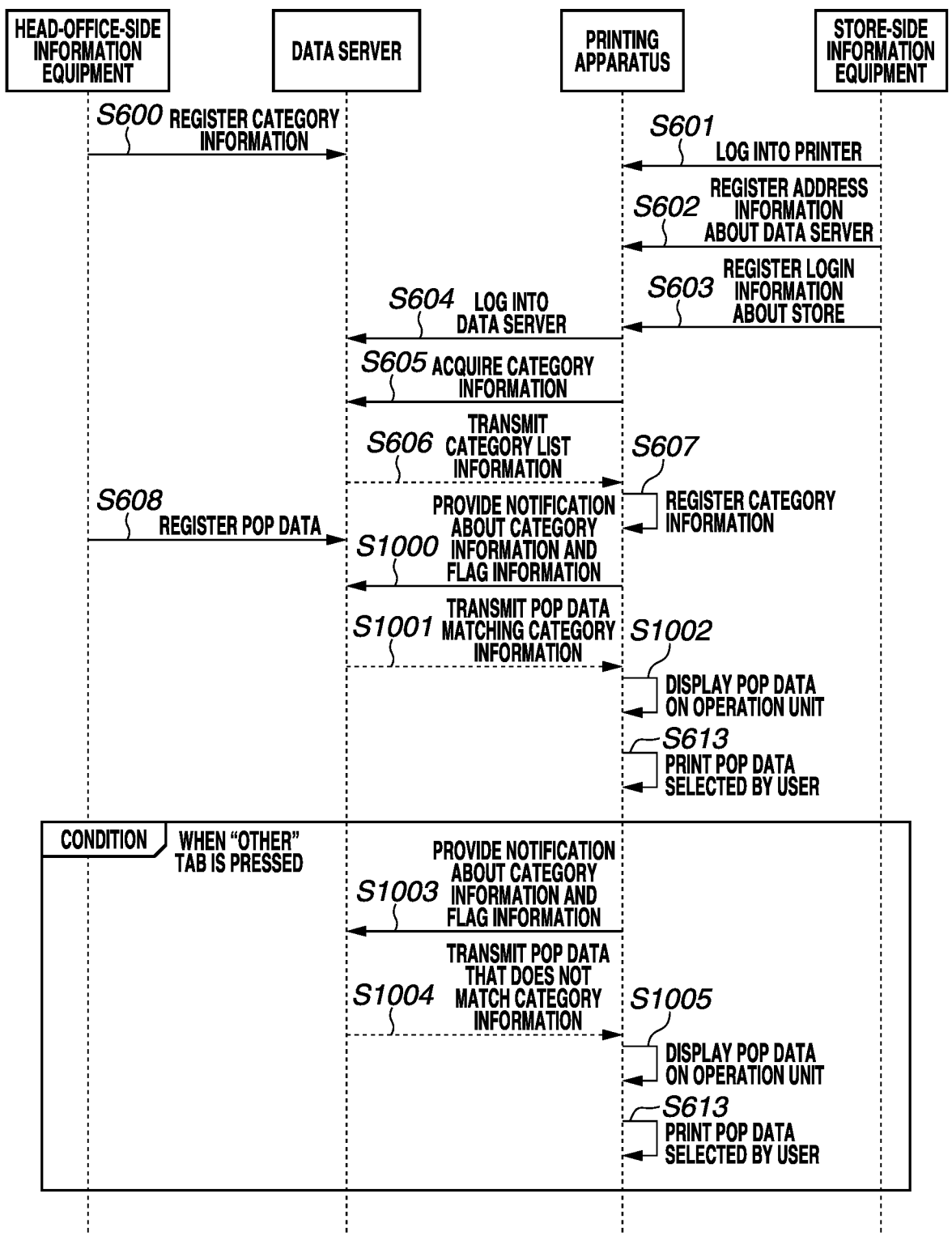

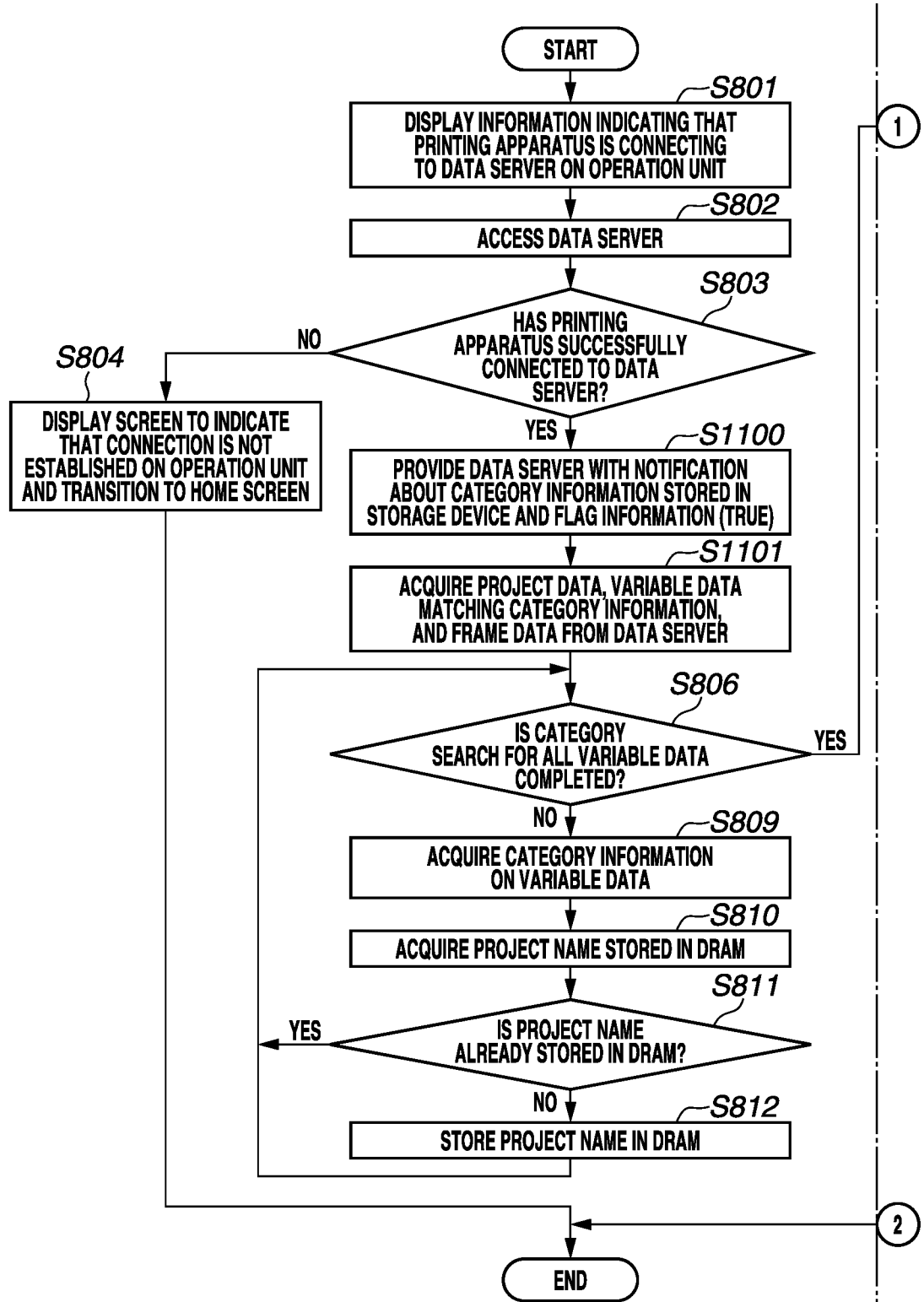

PRINTING SYSTEM TO PRINT POP DATA, PRINTING CONTROL APPARATUS, CONTROL METHOD FOR PRINTING CONTROL APPARATUS, AND STORAGE MEDIUM

BACKGROUND

Field of the Disclosure

The present disclosure relates to a printing system, a printing control apparatus, a control method for the printing control apparatus, and a storage medium.

Description of the Related Art

A display piece such as a point of purchase (POP) display is generally used as a method for describing articles and providing a notification about the price of each article in stores and the like. In a case where a large number of chain stores are present, it may be desirable to collectively create POP data for article description in a head office that manages the stores, instead of creating POP data for article description in each store. In this case, the POP data created in the head office is distributed to each store using a system for distributing the POP data to each store. In the case of using such a POP distribution system for article description, the head office periodically uploads POP data for article description to a data distribution server and updates the POP data. Each store accesses the data distribution server using information equipment such as a personal computer (PC) located in each store, and acquires the POP data for article description required for each store. The POP data is printed on paper by a printer located in each store, and the printed POP display for article description is displayed in each store.

The POP data for article description includes background image data called "frame data" that is commonly used regardless of the type of an article, and data called "variable data" that varies from article to article and indicates an article name, a price, and the like.

As discussed in Japanese Patent Application Laid-Open No. 2008-033635, it is known that information equipment, such as a PC, and a printing apparatus located in each store acquire frame data and variable data to be combined with the frame data from a data distribution server, combine the frame data with the variable data, and output the combined data.

Data to be printed from the variable data registered in the data distribution server can be selected on an information processing apparatus, such as a PC, and a printing apparatus located in each store to execute printing based on the selected data. However, if a large amount of variable data is registered in the data distribution server, a user on the store side needs to search for variable data to be printed by the user from among the large amount of variable data before issuing a print instruction.

SUMMARY

According to embodiments of the present disclosure, a printing system including a server apparatus and a printing control apparatus includes a registration unit configured to register image data, a plurality of pieces of data to be combined with the image data, and categories corresponding to the plurality of pieces of data, respectively, in the server apparatus, a selection unit configured to select at least one category from the categories registered in the server apparatus, a display control unit configured to display the plurality of pieces of data registered by the registration unit based on the at least one category selected by the selection unit, and a printing unit configured to print data by combining data selected by a user from among the plurality of pieces of displayed data with the image data.

Further features of the present disclosure will become apparent from the following description of exemplary embodiments with reference to the attached drawings.

BRIEF DESCRIPTION OF THE DRAWINGS

FIG. 2 illustrates a configuration example of image data to be printed in the printing system according to the first exemplary embodiment.

FIG. 3 is a table illustrating an example of category data in the first exemplary embodiment.

FIGS. 7A and 7B illustrate examples of a setting screen to be operated by a user according to the first exemplary embodiment.

FIGS. 8A and 8B are flowcharts illustrating processing to be executed by the printing apparatus according to the first exemplary embodiment.

FIGS. 9A and 9B illustrate examples of a printing execution instruction screen to be displayed on a display unit of the printing apparatus according to the first exemplary embodiment.

FIG. 10 illustrates an example of an overall sequence according to a second exemplary embodiment.

FIGS. 11A and 11B are flowcharts illustrating processing to be executed by the printing apparatus according to the second exemplary embodiment.

DESCRIPTION OF THE EMBODIMENTS

Exemplary embodiments of the present disclosure will be described below with reference to the drawings. The following exemplary embodiments are not intended to limit the disclosure. Not all of the combinations of the features described in the exemplary embodiments are indispensable for the solution to the issues of the present disclosure.

As an example of printing a printed product, a system in which data that forms a printed product is registered in a data server and a printing apparatus acquires the data from the data server and renders and prints print image data will be described.

Figure 1:
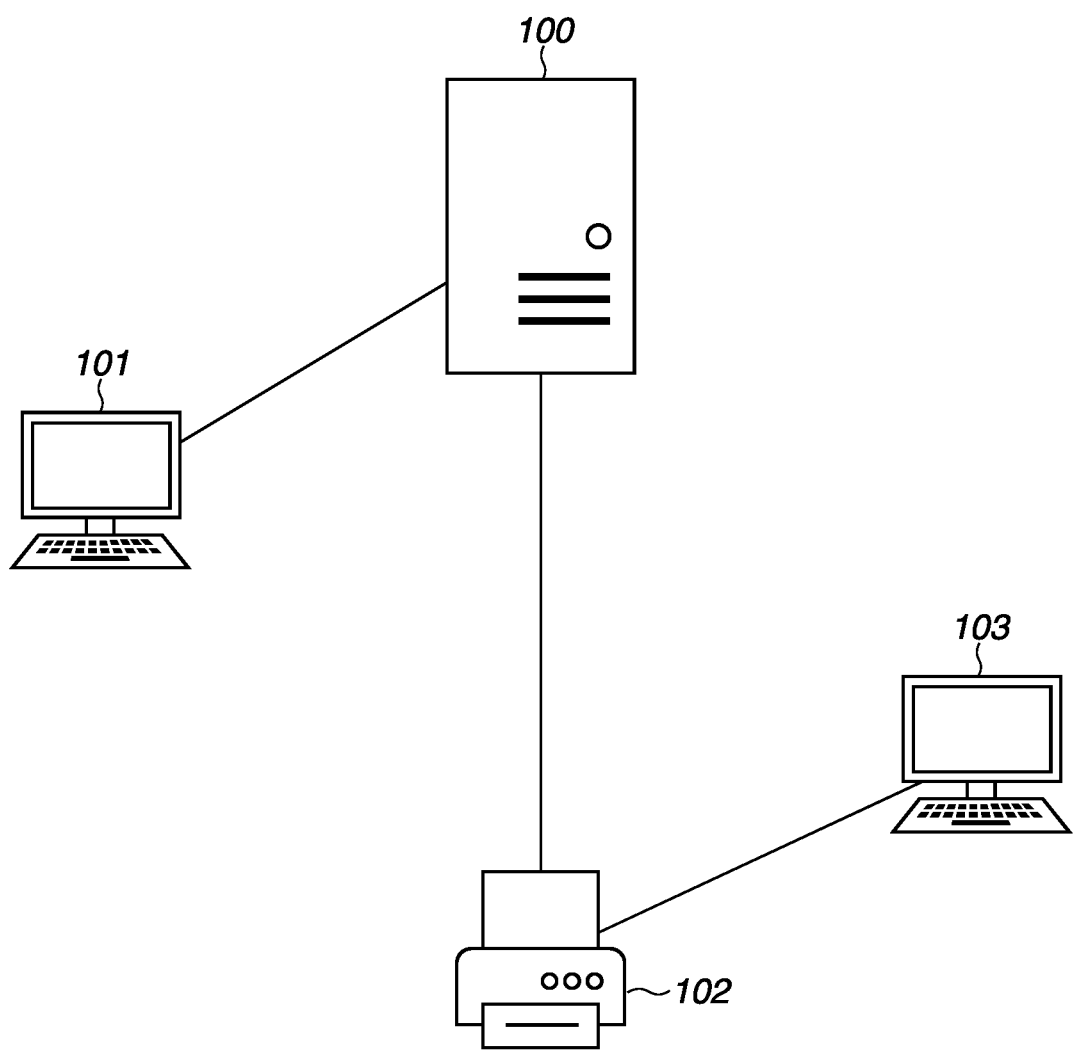
FIG. 1 is a block diagram illustrating a configuration example of a printing system according to a first exemplary embodiment.

FIG. 1 is a block diagram illustrating a configuration example of a printing system according to a first exemplary embodiment.

The first exemplary embodiment illustrates an example where an article point of purchase (POP) display indicating information about articles used in a supermarket or the like is printed as a printed product.

An information processing apparatus 101 is an information processing apparatus, such as a computer, that is used to register POP data to be printed in a data server 100. The information processing apparatus 101 may be any terminal such as a personal computer (PC), a tablet terminal, a mobile phone, or a smartphone.

The data server 100 is a server system that manages POP data for article description to be distributed by the information processing apparatus 101. In the present exemplary embodiment, a user creates POP data for article description using the information processing apparatus 101, and registers the POP data for article description in the data server 100. In the present exemplary embodiment, the POP data includes frame data indicating a POP background image and variable data to be combined with the frame data. The configuration of the POP data will be described below with reference to FIG. 2. The data server 100 illustrated in FIG. 1 is a server system including one server apparatus, but instead may include a plurality of server apparatuses.

A printing apparatus 102 is a printing control apparatus that prints the POP data for article description registered in the data server 100. The printing apparatus 102 checks whether there is POP data to be printed in the data server 100. If there is POP data to be printed, the printing apparatus 102 acquires the POP data from the data server 100. The printing apparatus 102 generates image data by combining print images formed based on the received data, and executes printing based on the generated image data.

The data server 100 and the printing apparatus 102 are connected via a network. It is herein assumed that the data server 100 is located in facilities functioning as a head office that manages chain stores or the like. On the other hand, the printing apparatus 102 is located in each store. It is herein assumed that a printed product required for each store is acquired and printed in each store. An information processing apparatus 103 is an information processing apparatus located in each store. The information processing apparatus 103 may be any information processing apparatus such as a PC, a tablet terminal, a mobile phone, or a smartphone. The information processing apparatus 103 is used to register category information to be printed using the printing apparatus 102. Instead of using the information processing apparatus 103, category information may be registered on the printing apparatus 102.

FIG. 2 illustrates a configuration example of image data to be printed in the printing system according to the present exemplary embodiment. POP data 200 includes project data, variable data, and frame data. The term "POP data" used herein refers to data including variable data, project data, and frame data.

A project data table 201 is a table to manage project data including information about a term during which the POP data 200 is displayed and information about frame data used for the project. The project data includes "project ID", "project name", "term", and "frame data ID". The "project ID" is the number uniquely assigned to each row of the distributed project data table 201. The "project ID" is information to associate the project data registered in the project data table 201 with variable data registered in a variable data table 202. The "project name" represents the name of each of the distributed projects. The "project name" is set by the user that registers POP data in the data server 100. The "term" represents the term during which POP data is displayed. The "frame data ID" is the number for identifying frame data to be used in the project.

The variable data table 202 is a table to manage variable data to be combined with frame data. The variable data includes "article ID", "article name", "category ID", "price", "project ID", and "print status". The "article ID" is the number uniquely assigned to each row of the distributed variable data table 202. The "article ID" is automatically assigned by the data server 100. The "article name" represents the name of each of the distributed articles, and is set by the user. The "category ID" is the number to associate the article with category data illustrated in FIG. 3. The "price" is the value representing the price of each of the distributed articles. The "project ID" is the number to associate the article with project data. The "print status" is information indicating whether the POP on which information about the article is printed is printed or not printed. The "article name" and "price" are text data to be combined with frame data.

A frame data table 203 includes frame data representing the design of the outline of each print image, and a frame name. The "frame data ID" is identification information for identifying frame data. The "frame name" represents the name to be registered for the user to identify frame data. In the "frame data" row, a file path and a file name for image data to be used as a background are registered.

The frame data table 203 is a table to manage frame data as background image data to be combined with variable data. The frame data includes layout information indicating a location where information about "article name" and "price" included in variable data is to be located. The printing apparatus 102 refers to the "project ID" recorded on each record of the variable data table 202 and identifies the frame data corresponding to the "project ID". The "article name" and "price" that are recorded on each record of the frame data are combined to generate POP image data 205. The printing apparatus 102 prints a POP based on the POP image data 205.

Category data according to the present exemplary embodiment will now be described with reference to FIG. 3. A category data table 300 is a table to manage category information to be registered in the data server 100 by the user. The category data includes "category ID" and "category name", and is registered in the data server 100 from the information processing apparatus 101 that distributes POP data. The "category ID" is the number uniquely assigned to each row of the category data table 300. The "category name" represents the name of each of the registered categories, and is set by the user. FIG. 3 illustrates an example of a list of categories registered in the data server 100.

The category data according to the present exemplary embodiment is data used to sort the articles registered as variable data based on the categories.

Figure 4:
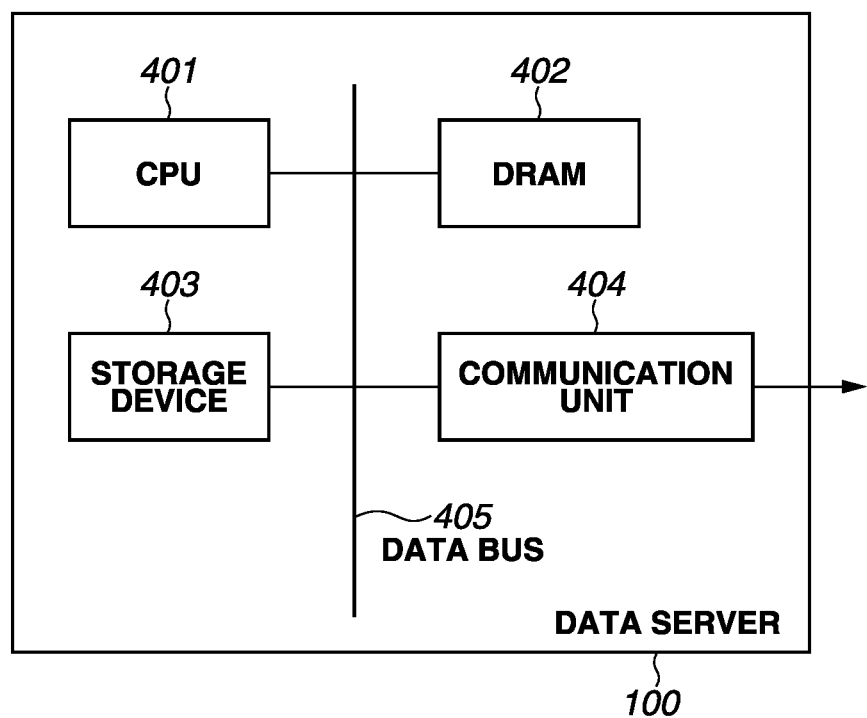
FIG. 4 is a block diagram illustrating a hardware configuration example of a data server according to the first exemplary embodiment.

FIG. 4 is a block diagram illustrating a hardware configuration example of the data server 100.

The data server 100 includes a storage device 403 that stores the project data table 201 that holds display term information, the variable data table 202 that holds article data, and the frame data table 203 that holds frame data representing the design image of the outline of each print image. The storage device 403 is a storage device such as a hard disk drive (HDD) or a static random access memory (SRAM).

A central processing unit (CPU) 401 is a module that functions as a system control unit and controls the entire apparatus. A dynamic RAM (DRAM) 402 stores program control variables and the like. A communication unit 404 is a module configured to establish communication via a network. A request for transmitting the POP data 200 is sent from the printing apparatus 102 located in each store and is received via the communication unit 404. Upon receiving the request for transmitting the POP data 200, the CPU 401 performs arithmetic processing on project data, variable data, and frame data, which are held in storage device 403, in response to the transmission request. The CPU 401 transmits the POP data 200 for the printing apparatus 102 located in each store from the communication unit 404 based on the arithmetic processing result. Variables and the like used during the arithmetic processing are stored in the DRAM 402. The processing units are connected via a data bus 405.

Figure 5:
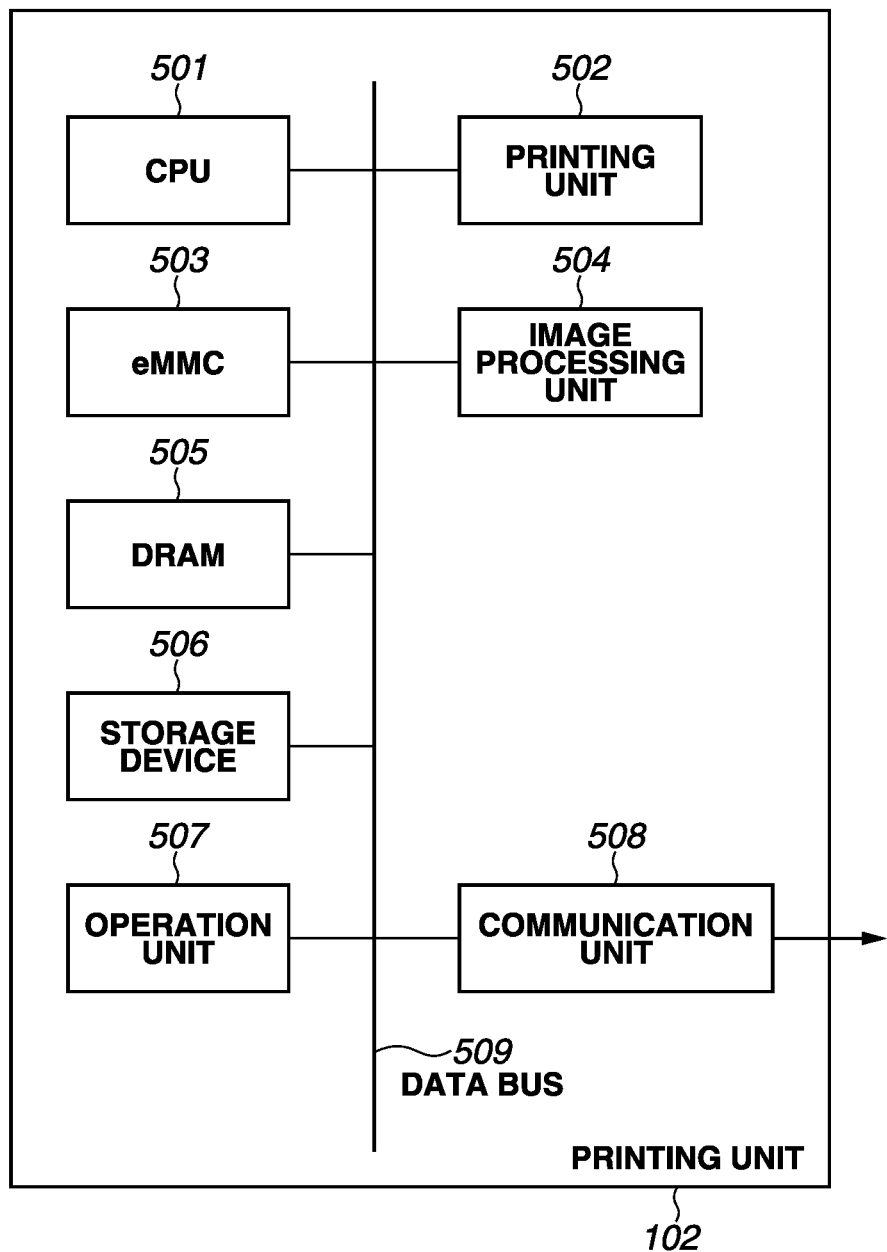
FIG. 5 is a block diagram illustrating a hardware configuration example of a printing apparatus according to the first exemplary embodiment.

FIG. 5 is a block diagram illustrating a hardware configuration example of the printing apparatus 102 according to the present exemplary embodiment.

In the printing apparatus 102, a CPU 501 functions as a system control unit and controls the entire apparatus. In the present exemplary embodiment, the CPU 501 also performs display control processing such as processing of generating a screen to be displayed on an operation unit 507. An embedded MultiMediaCard (eMMC) 503 is composed of a flash memory and stores control programs for the CPU 501. The hardware for storing control programs for the CPU 501 is not limited to the eMMC 503. A DRAM 505 is a volatile memory that stores program control variables and the like and is configured to temporarily store image data and the like to be processed by the CPU 501. A storage device 506 is a storage device, such as an HDD, and is a non-volatile memory that stores data such as image data. For example, data that forms a printed product is stored in the storage device 506. The operation unit 507 is a user interface unit that is composed of a display unit that displays information regarding inside the equipment and a reception unit that receives a user operation. A printing unit 502 is a unit that prints image data on a recording sheet. The printing unit 502 applies toner on a recording sheet and pressurizes the toner and the recording sheet with a heated fixing device, thereby fixing the toner onto the recording sheet. An image processing unit 504 combines and renders image data handled in image printing, and performs encoding and decoding processing on the binary image data. A communication unit 508 is an interface unit for communication between equipment and an external communication network. The processing units are connected via a data bus 509.

Figure 6:
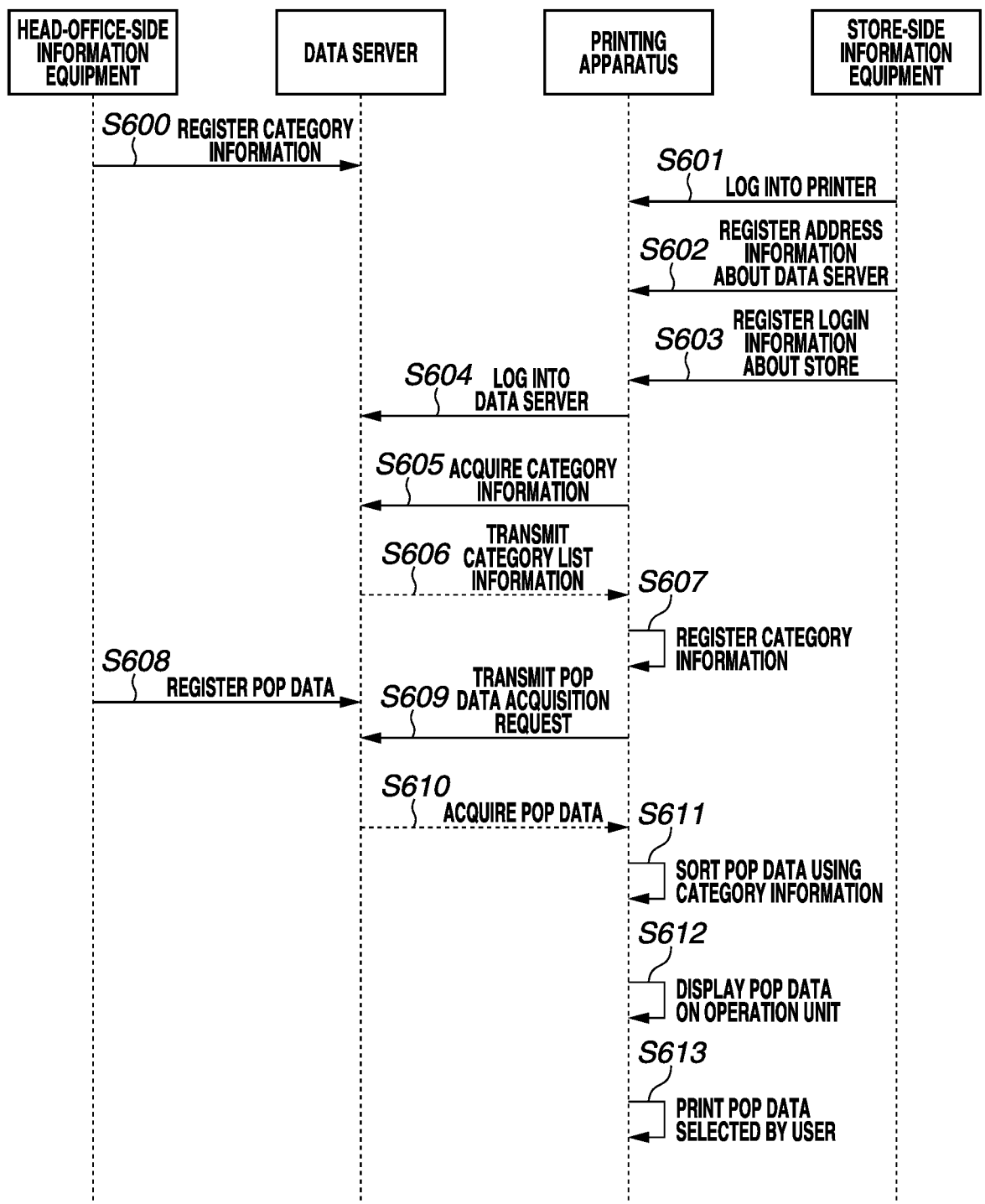
FIG. 6 illustrates an example of an overall sequence for the printing system according to the first exemplary embodiment.

An overall sequence for the printing system according to the present exemplary embodiment will be described with reference to FIG. 6.

First, in step S600, the information processing apparatus 101 located on the head office side registers category information in the data server 100. The processing of step S600 is executed to register category data in the category data table 300 illustrated in FIG. 3. The "category name" is arbitrary character string set by the user who operates the information processing apparatus 101. The "category ID" is the number automatically assigned by the data server 100.

Next, in step S601, the information processing apparatus 103 located on the store side accesses the printing apparatus 102 via a network, inputs the user ID and password registered in the printing apparatus 102, and logs into the printing apparatus 102. The user uses a web browser installed on the information processing apparatus 103, accesses a web server of the printing apparatus 102, and logs into the printing apparatus 102.

After login process, in step S602, the printing apparatus 102 registers the address of the data server 100 that distributes the POP data 200 according to a user instruction. When the user has successfully logged into the printing apparatus 102, a login information registration screen 700 illustrated in FIG. 7A is displayed on a display unit of the information processing apparatus 103. The login information registration screen 700 includes an area 701 where a uniform resource locator (URL) to access the data server 100 is input, an area 702 where a store ID is input, an area 703 where a password is input, and a registration button 704 to register settings. The user inputs the URL of the data server 100 in which project data, variable data, and frame data are stored to the area 701.

In step S603, the printing apparatus 102 accesses the data server 100 and registers login information, including the store ID and password, that is used for login on the login information registration screen 700 illustrated in FIG. 7A. The user inputs the store ID of the store where the printing apparatus 102 is located to the area 702. This store ID is information corresponding to a login ID for acquiring data from the data server 100. The user inputs a login password to the area 703 and presses the registration button 704. Thus, the printing apparatus 102 registers setting information in the storage device 506. In the present exemplary embodiment described above, the setting of information in steps S602 and S603 is made by accessing the printing apparatus 102 from the information processing apparatus 103. Instead of using the information processing apparatus 103, the URL of the data server 100, store ID, and password may be set from the operation unit 507 of the printing apparatus 102.

In step S604, the printing apparatus 102 accesses the data server 100 based on the information registered in the printing apparatus 102 in steps S602 and S603 and logs into the data server 100. The printing apparatus 102 transmits the store ID set in the area 702, the password set in the area 703, and a login request to the URL set in the area 701. The data server 100 performs authentication processing using the received store ID and password. When the authentication processing is successful, the data server 100 causes the printing apparatus 102 to log into the data server 100. In the present exemplary embodiment, the state where the printing apparatus 102 has logged into the data server 100 indicates a state where the printing apparatus 102 can acquire the project data, variable data, and frame data registered in the data server 100.

After that, in step S605, the printing apparatus 102 transmits a request for acquiring category list information registered in the data server 100 to the data server 100.

In step S606, the data server 100 transmits the registered category list information to the printing apparatus 102 that has transmitted the acquisition request. The category list information transmitted in this case is information about the category data table 300 illustrated in FIG. 3. The printing apparatus 102 displays a category information registration screen 705 on the operation unit 507 based on the acquired category list information. The category information registration screen 705 includes category information 706 acquired in step S606, a checkbox 707, and a registration button 708. The checkbox 707 is used to select one or more pieces of category information to be printed by the printing apparatus 102. The registration button 708 is used to register the selected category information. The category information registration screen 705 is a screen for setting variable data of articles to be preferentially displayed in the printing apparatus 102. For example, in a case where the store in which the printing apparatus 102 is set sells beverages and does not sell confectionery, "beverage" is registered as a category and "confectionery" is not registered as a category. This configuration prevents information about confectionery that is not available in the store from being displayed, on the screen on which the articles to be printed are selected, in preference to information about beverages available in the store.

When the user selects the checkbox 707 corresponding to one or more categories to be registered and presses the registration button 708, in step S607, the printing apparatus 102 registers the selected category information in the storage device 506.

Next, in step S608, the information processing apparatus 101 registers the POP data 200 in the data server 100 to update the printed product of POP data for article description. In this case, the information processing apparatus 101 registers project data, variable data, and frame data in the data server 100. In this case, the data server 100 may provide a notification to the printing apparatus 102 located in each store to inform that the POP data 200 is registered. In this case, the printing apparatus 102 that has received the notification accesses the data server 100 and acquires the registered POP data. In place of the configuration in which the data server 100 provides the notification, the printing apparatus 102 may periodically access the data server 100 to check if new POP data is registered. In the present exemplary embodiment, assume that the printing apparatus 102 accesses the data server 100 at a predetermined timing, sends an inquiry about whether new POP data is registered, and acquires POP data when new POP data is registered. The predetermined timing is, for example, time set in advance by the user, after a lapse of a predetermined period from the time when data is previously acquired, or when the user selects a predetermined button using the operation unit 507 of the printing apparatus 102.

In step S609, the printing apparatus 102 located in each store accesses the data server 100 to transmits a request for acquiring the POP data 200 distributed in step S608.

In step S610, the data server transmits the POP data 200 to the printing apparatus 102 in response to the request transmitted in step S609.

The printing apparatus 102 performs sorting processing on the POP data received in step S610 using the category information registered in step S607. In step S611, the sorting processing is performed such that variable data that matches the category information registered in step S607 is located at a higher place in the list. This processing makes it possible to display the articles corresponding to the categories registered in advance at the top of the list compared to the other articles in the list, which enables the user to save time and labor to search for variable data corresponding to the articles to be printed.

In step S612, after sorting the variable data, the printing apparatus 102 displays the project data and the variable data on the operation unit 507 and receives the data selected by the user.

In step S613, the printing apparatus 102 combines the variable data selected by the user with the frame data corresponding to the variable data, and executes printing based on the combined image data.

The processing to be performed by the printing apparatus 102 according to the present exemplary embodiment will be described with reference to FIGS. 8A and 8B.

Figure 8B:
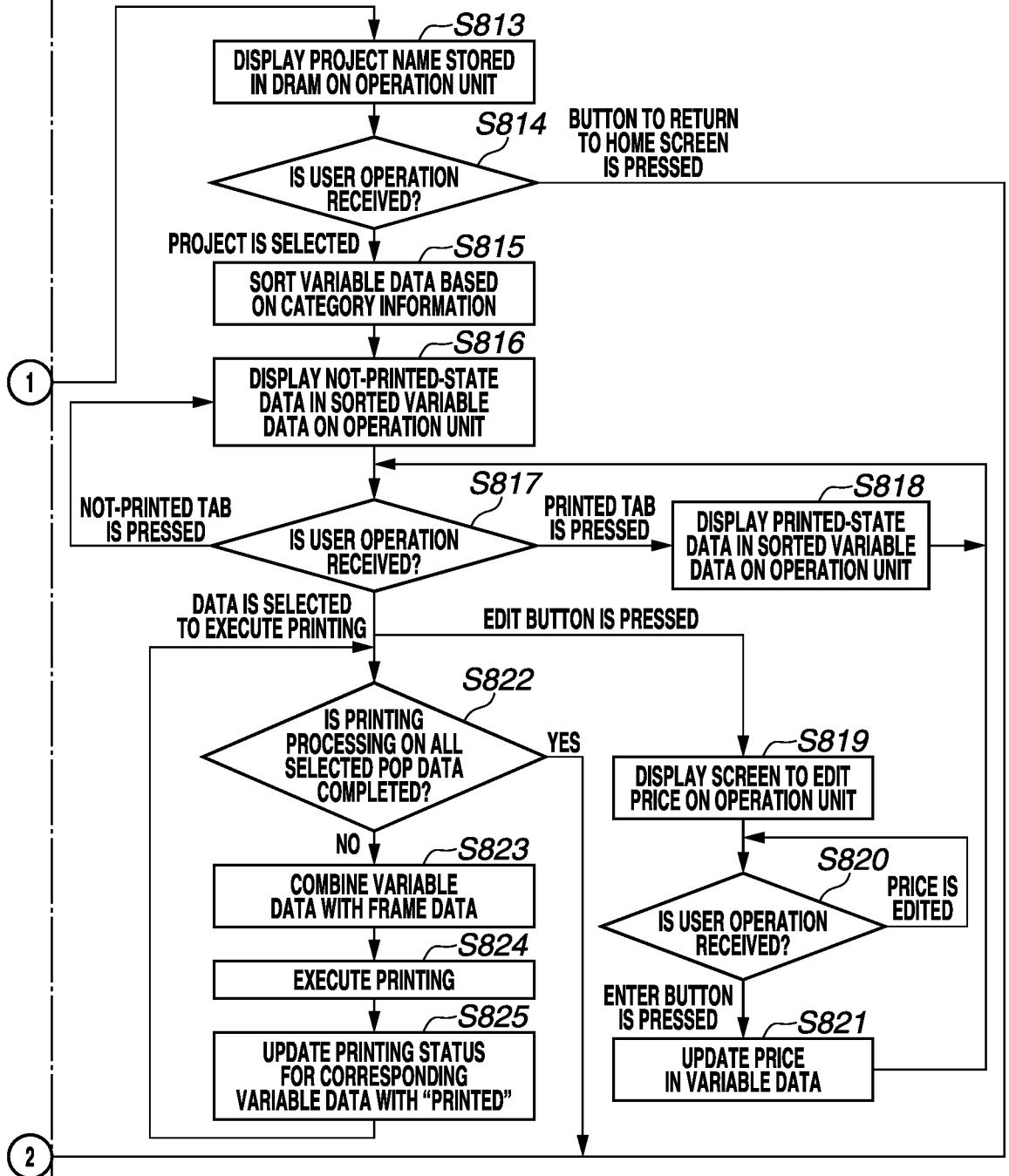
Figure 9A:
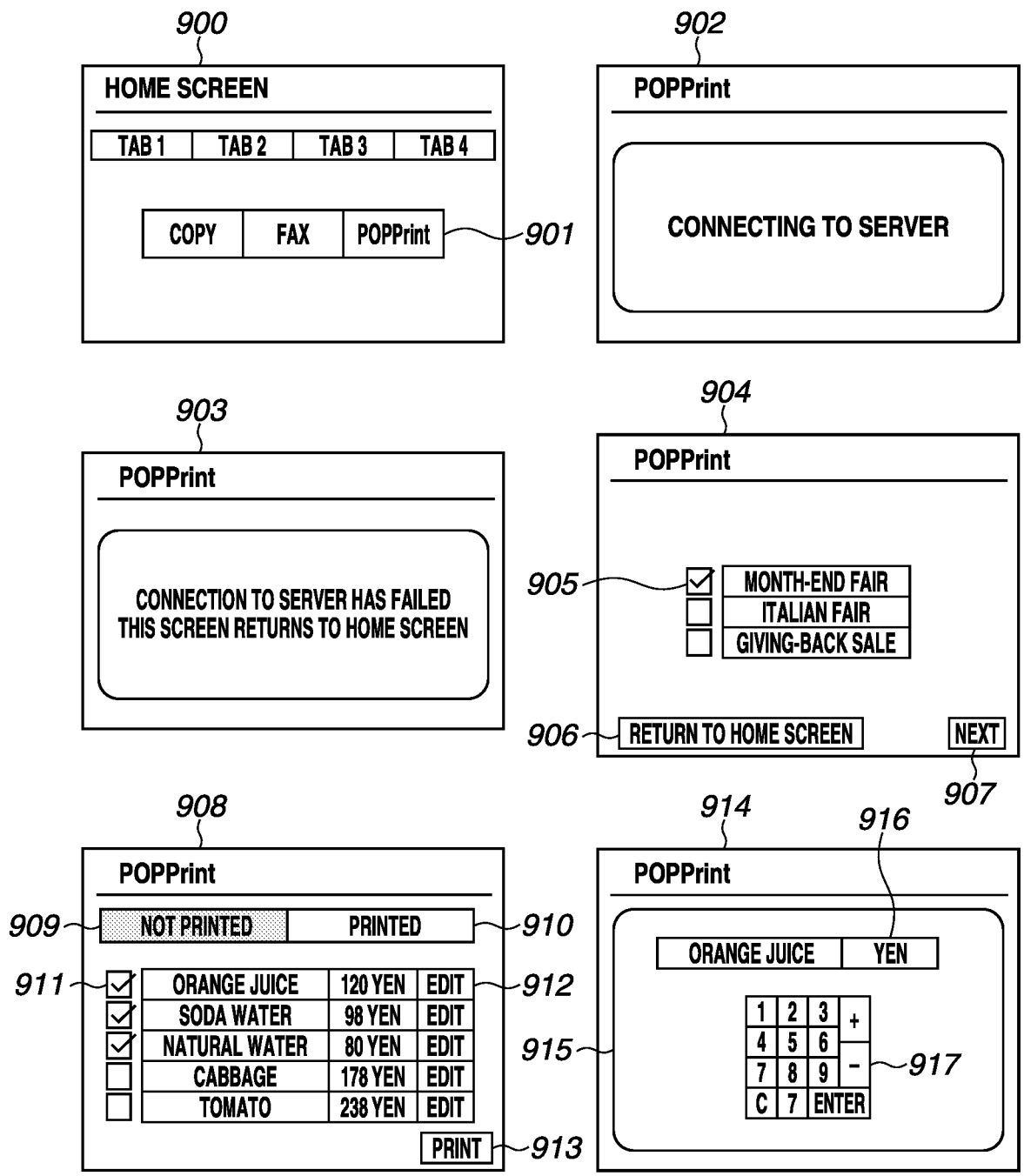

The processing illustrated in FIGS. 8A and 8B is started when a POP print application button 901 is pressed on a home screen 900 illustrated in FIG. 9A that is displayed on the operation unit 507 of the printing apparatus 102. The home screen 900 is a screen on which objects to start functions provided by the printing apparatus 102 are located. Processing described in each block illustrated in FIGS. 8A and 8B is implemented such that the CPU 501 of the printing apparatus 102 executes programs.

In step S801, the CPU 501 displays a screen 902 to provide a notification indicating that the printing apparatus 102 is connecting to the data server 100 on the operation unit 507. On the home screen 900, the POP print application button 901 to start a POP print application is displayed in addition to the buttons respectively corresponding to the functions to be executed in the printing apparatus 102. When the POP print application button 901 is selected, the processing of the flowcharts illustrated in FIGS. 8A and 8B is started. The screen 902 to indicate that the printing apparatus 102 is connecting to the data server 100 is displayed on the operation unit 507 during a period in which the printing apparatus 102 is accessing the data server 100 using the information set on the login information registration screen 700 illustrated in FIG. 7.

After step S801, in step S802, the CPU 501 accesses the data server 100 using the address, store ID, and password of the data server 100 that are registered in the storage device 506. The CPU 501 transmits the store ID and password and an authentication request to the data server 100.

The CPU 501 receives a response from the data server 100. The data server 100 performs authentication processing using the received store ID and password, and transmits the authentication processing result to the printing apparatus 102.

In step S803, the CPU 501 determines whether the printing apparatus 102 has successfully connected to the data server 100. The CPU 501 determines whether the printing apparatus 102 has successfully connected to the data server 100 based on the content of the response from the data server 100. Upon receiving a notification indicating that the login is successful from the data server 100, the CPU 501 determines that the printing apparatus 102 has successfully connected to the data server 100. On the other hand, if a notification indicating an error is received from the data server 100, or if no response is received from the data server 100 even after the lapse of the predetermined period, the CPU 501 determines that the printing apparatus 102 has not successfully connected to the data server 100.

If no response is received within the predetermined period from the time when the access to the data server 100 is started, or if the authentication has failed (NO in step S803), the processing proceeds to step S804. In step S804, the CPU 501 displays a screen 903 to provide a notification indicating that the printing apparatus 102 has not successfully connected to the data server 100 on the operation unit 507, and causes the screen to transition to the home screen 900 to terminate the processing.

If the authentication is successful within the predetermined period from the time when the access to the data server 100 is started (YES in step S803), the processing proceeds to step S805. In step S805, the CPU 501 acquires the project data, variable data, and frame data distributed from the data server 100. In step S805, the data server 100 acquires all of the project data, variable data, and frame data distributed to the store indicated by the store ID with which the data server 100 has logged in.

In step S806, the CPU 501 determines whether category search for all acquired variable data is completed. The category search is processing of steps S807 to S812 to be described below.

If the processing on all the variable data is completed (YES in step S806), the processing proceeds to step S813.

If the processing on all the variable data is not completed (NO in step S806), the processing proceeds to step S807. In step S807, the CPU 501 acquires category information with reference to one piece of variable data on which the processing is not completed in the variable data.

In step S808, the CPU 501 determines whether the category information acquired in step S807 matches the category information registered in the storage device 506.

This is processing for determining whether the one piece of variable data referenced in step S807 corresponds to category data preliminarily registered in the printing apparatus 102.

If the category information about the referenced variable data is different from the category information registered in the printing apparatus 102 (NO in step S808), the processing returns to step S806 to refer to the next variable data. The category information registered in the storage device 506 is category information registered on the category information registration screen 705 illustrated in FIG. 7B.

If the category information about the referenced variable data matches the category information registered in the printing apparatus 102 (YES in step S808), the processing proceeds to step S809. In step S809, the CPU 501 acquires the "project name" from the project data corresponding to the variable data. In this case, the CPU 501 refers to the "project ID" included in the variable data and acquires the "project name" corresponding to the "project ID" included in the variable data from the acquired project data.

Next, in step S810, the CPU 501 acquires the "project name" stored in the DRAM 505.

Then, in step S811, the CPU 501 determines whether the "project name" in the project data is already stored in the DRAM 505. If the "project name" is already stored in the DRAM 505 (YES in step S811), the processing returns to step S806 to perform processing on the next variable data.

If the "project name" in the project data is not stored in the DRAM 505 (NO in step S811), the processing proceeds to step S812. In step S812, the CPU 501 stores the "project name" in the DRAM 505.

The processing of steps S807 to S812 will be described using the category data table 300 illustrated in FIG. 3 and the variable data table 202 illustrated in FIG. 2 by way of example. Assume that the category "beverage" is registered in the printing apparatus 102. The "category ID" is compared with the "category ID" registered in the printing apparatus 102 for each row of the variable data table 202.

Variable data in a first row indicates the article name "cabbage" and the category ID "3". The category ID does not match the category ID registered in the printing apparatus 102, and thus the processing proceeds to processing on the next row.

Variable data in the next row indicates the article name "tomato" and the category ID "3". The category ID in this variable data does not match the category ID registered in the printing apparatus 102, and thus the processing proceeds to processing on the next row.

Variable data in the next row indicates the article name "orange juice" and the category ID "1". The category ID in this variable data matches the category ID registered in the printing apparatus 102. Accordingly, the "project name" is acquired with reference to the project data based on the "project ID". Since the "project ID" is "1", it is obvious that the "project name" corresponding to the project ID "1" in the project data is "month-end fair". Next, it is checked whether information about this "project name" is already stored in the DRAM 505. Because "month-end fair" is not stored yet, the character string "month-end fair" is stored in the DRAM 505.

Variable data in the next row indicates the article name "soda water" and the category ID "1". The category ID in this variable data matches the category ID registered in the printing apparatus 102. Accordingly, the "project name" is acquired with reference to the project data based on the "project ID". Since the "project ID" is "1", it is obvious that the "project name" corresponding to the project ID "1" in the project data is "month-end fair". Next, it is checked whether information about this "project name" is already stored in the DRAM 505. Since the character string "month-end fair" is already stored in the DRAM 505, the processing proceeds to processing on the next row without performing any particular processing.

The above-described processing is repeatedly performed on all the acquired variable data, and the project names are stored in the DRAM 505.

If the CPU 501 has completed search for the category information on all the variable data (YES in step S806), the processing proceeds to step S813. In step S813, a screen 904 to display a list of project names is generated using the project names stored in the DRAM 505, and the generated screen 904 is displayed. The screen 904 to display the list of project names will be described with reference to FIG. 9A. This screen 904 is an example of a screen to display project names including the variable data that matches the category information registered by searching based on the category information preliminarily registered in the storage device 506 in the project data and variable data acquired from the data server 100. The screen 904 to display a list of project names includes a list of project names, a checkbox 905 to select a printing target, a button 906 to return to the home screen 900, and a screen transition button 907 to transition to a screen to display articles associated with the selected project.

In step S814, the CPU 501 receives a user operation on the screen 904. In step S814, the CPU 501 switches the control operation based on the button selected by the user. If the button 906 to return to the home screen 900 is selected, the CPU 501 displays the home screen 900 on the operation unit 507 and then terminates the processing. If the screen transition button 907 is selected in a state where the user has selected the checkbox 905, the processing of step S815 is carried out. The screen transition button 907 is grayed out in a state where the checkbox 905 is not selected, and thus the user cannot select the screen transition button 907.

In step S815, the CPU 501 performs sorting processing such that the variable data that matches the category information registered in the storage device 506 is located at the top of the list in the variable data associated with the selected project data.

Then, in step S816, the CPU 501 displays only data in which the print status indicates "not printed" in the sorted variable data on a screen 908 to select a printed product. The screen 908 to select a printed product includes a checkbox 911 to select each variable data, a button 912 to edit the price and the like, and a print button 913 to print the variable data selected on the checkbox 911. A "not printed" tab 909 and a "printed" tab 910 are displayed on the screen 908. On the screen 908, the articles with the "project ID" indicating "1" and the category ID indicating "1" are located at the top of the list. With this configuration, article information that is more likely to be printed in the location where the printing apparatus 102 is located can be displayed in preference to information about the other articles. During the display in step S816, if there is no "not printed" variable data, the CPU 501 displays a message indicating that there is no "not printed" variable data on the operation unit 507.

In step S817, the CPU 501 switches the control operation based on the button selected by the user. If the "not printed" tab 909 is pressed, the CPU 501 executes processing of step S816. If the "not printed" variable data is already displayed, the variable data is continuously displayed. If the "printed" tab 910 is pressed, the processing proceeds to step S818. In step S818, the CPU 501 displays only the data in which the print status indicates "printed" in the variable data sorted in step S815 on the operation unit 507.

After the processing of step S818, the processing returns to step S817. Also, in step S818, if there is no "printed" variable data, the CPU 501 displays a message indicating that there is no "printed" variable data on the operation unit 507.

If the button 912 to edit the price is pressed, the processing proceeds to step S819. In step S819, the CPU 501 displays a screen 914 to change the price in the corresponding variable data on the operation unit 507. The screen 914 to change the price in the variable data includes an area 915 to display the article name of the target variable data, an area 916 to display the currently input price, and a numeric keypad 917 to edit the price. In step S820, the user sets the price using the numeric keypad 917 displayed on the operation unit 507. If an enter button is pressed, the processing proceeds to step S821. In step S821, the CPU 501 updates the price in the corresponding variable data with the set price. After that, the processing returns to step S817.

If the user selects variable data to be printed and presses the print button 913 in step S817, the processing proceeds to step S822. In step S822, the CPU 501 performs printing processing based on the selected variable data.

The CPU 501 refers to frame data based on each piece of variable data and project data associated with the variable data. In step S823, the image processing unit 504 reads out information corresponding to the location where the "article name" and "price" in the variable data are located from the layout information included in the frame data, and combines the variable data at the location where the frame data is read out. After that, in step S824, the CPU 501 executes printing on the print images combined in step S823. In step S825, the CPU 501 updates the print status of the corresponding variable data with "printed". If the information processing apparatus 101 on the head office side monitors the print status on the variable data registered in the data server 100, the CPU 501 may provide a notification about the variable data in which the print status is updated after step S825.

Thus, the operation of the printing apparatus 102 is terminated.

A screen 918 is an example of a screen to be displayed when the screen to select a printed product is displayed again after the checkbox 911 is selected and the print button 913 is pressed on the screen 908 to select a printed product. On the screen 918, the "not printed" tab 909 is selected. In this case, "orange juice", "soda water", and "natural water" that are variable data based on which printing has already been executed are not displayed on the screen 908 to select a printed product. Further, if the "printed" tab 910 is pressed in this state, the screen 918 transitions to a screen 919 to select a printed product, and the variable data based on which printing has already been executed is displayed on this screen 919.

FIGS. 8A and 8B illustrate an example where, when the POP print application button 901 is selected on the home screen 900, the printing apparatus 102 accesses the data server 100 and acquires POP data to be registered. POP data may be acquired based on a notification transmitted to the printing apparatus 102 based on the registration of POP data in the data server 100, or POP data may be acquired from the data server 100 at a time or timing set by the user in advance. In this case, the processing of steps S801 to 805 illustrated in FIG. 8A may be omitted.

As described above, in the first exemplary embodiment, category information is registered in the printing apparatus 102, and article data corresponding to the registered category information is displayed at the top of the list. This configuration facilitates the user to select articles corresponding to categories registered in advance.

In the first exemplary embodiment, the printing apparatus 102 acquires all the POP data 200 acquired from the data server 100 regardless of the category information, and sorts and displays the POP data 200. In a second exemplary embodiment, only the POP data 200 that matches the category information is acquired from the data server 100 and only the POP data 200 that matches the category information registered in advance is displayed on the operation unit 507, thereby enabling the user to easily handle the data. The configuration according to the second exemplary embodiment makes it possible to reduce the amount of POP data to be acquired at once from the data server 100 and to reduce the time required for communication between the data server 100 and the printing apparatus 102.

FIG. 10 illustrates an overall sequence according to the second exemplary embodiment. Steps S600 to S608 illustrated in FIG. 10 are identical to steps S600 to S608 illustrated in FIG. 6 and are denoted by the same step numbers as those in FIG. 6, and thus the descriptions thereof are omitted.

Processing of step S1000 and subsequent processing according to the second exemplary embodiment are different from the processing according to the first exemplary embodiment. In step S1000, the printing apparatus 102 transmits, to the data server 100, the category information registered in step S607 and an acquisition request for acquiring only data that matches the category information registered in the variable data. In step S1000, the printing apparatus 102 provides the data server 100 with a notification about flag information indicating the acquisition request for acquiring the POP data that matches the registered category information.

In step S1001, the data server 100 transmits the POP data 200 distributed based on the category information and flag information received in step S1000 to the printing apparatus 102. In step S1001, the data server 100 selects, from the registered POP data 200, articles corresponding to the category information designated in the acquisition request received from the printing apparatus 102. The data server 100 transmits the POP data on the selected articles to the printing apparatus 102. In step S1002, the printing apparatus 102 displays a screen 920 illustrated in FIG. 9B based on the received POP data. The screen 920 illustrated in FIG. 9B will now be described. The screen 920 includes the "not printed" tab 909, the "printed" tab 910, an "other" tab 921, the checkbox 911, the "edit" button 912, and the "print" button 913. The checkbox 911, the "edit" button 912, and the "print" button 913 are buttons for performing processing similar to that of the first exemplary embodiment, and thus the descriptions thereof are omitted. The "not printed" tab 909 is an object to display a list of POP data which matches the category information registered in the printing apparatus 102 and on which printing has not been executed by the printing apparatus 102. In the present exemplary embodiment, "not printed" in the printing apparatus 102 indicates that printing based on POP data has not been executed in the printing apparatus in which the account of the store ID and password registered in the printing apparatus 102 is registered. The "printed" tab 910 is an object to display a list of POP data which matches the category information registered in the printing apparatus 102 and on which printing has been completed by the printing apparatus 102. The "printed" tab 910 is used, for example, when POP based on the "printed" POP data is printed again. The "other" tab 921 is an object to display POP data corresponding to categories other than the categories registered in the printing apparatus 102. The "other" tab 921 is used to print the POP display for articles corresponding to categories different from the articles of the categories registered in advance. If the "print" button 913 is selected, the printing apparatus 102 executes printing processing on the POP data described above in step S613.

An operation to be performed when the "other" tab 921 is selected on the screen 920 will now be described.

If the "other" tab 921 is selected on the screen 920, in step S1003, the printing apparatus 102 provides the data server 100 with a notification about the registered category information and flag information indicating a request for acquiring POP data that does not match the registered categories. The data server 100 that has received the category information and flag information transmitted from the printing apparatus 102 in step S1003 selects POP data on category information that does not match the category information received from the registered POP data. In step S1004, the data server 100 transmits the POP data 200 that does not match the category information received in step S1003 to the printing apparatus 102. In step S1005, the printing apparatus 102 displays the received POP data 200 on the operation unit 507. A screen 922 illustrated in FIG. 9B is an example of a screen to be displayed by the printing apparatus 102 in step S1005. In this case, "cabbage" and "tomato" that are categorized into the category "vegetable" that does not match the registered category information are displayed as a list. With this configuration, POP data corresponding to categories other than the categories registered in advance can also be printed. When the user selects POP data and selects "print", the printing apparatus 102 starts printing. This processing is similar to the processing of step S613 illustrated in FIG. 6 according to the first exemplary embodiment, and thus the description thereof is omitted.

The operation of the printing apparatus 102 according to the second exemplary embodiment will be described in more detail with reference to a flowchart illustrated in FIGS. 11A and 11B. Processes similar to those of the first exemplary embodiment are denoted by the same step numbers as those in FIGS. 8A and 8B and the descriptions thereof are omitted. Each block in the flowchart illustrated in FIGS. 11A and 11B is executed by the CPU 501 of the printing apparatus 102.

Figure 11B:
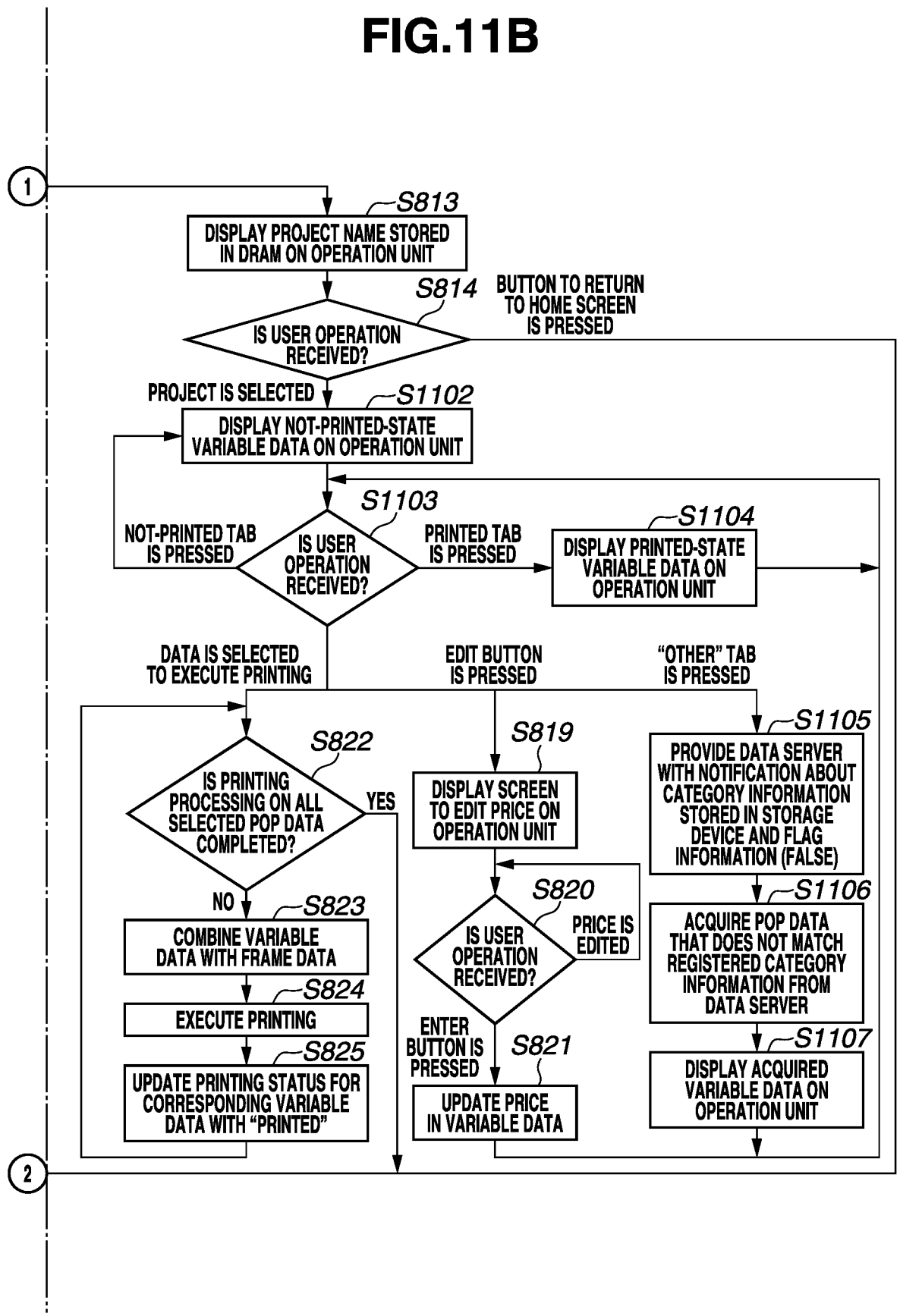

Steps S801 to S804, steps S813 and S814, and steps S819 to S825 in FIGS. 11A and 11B are similar to the corresponding steps in FIGS. 8A and 8B, and thus the descriptions thereof are omitted.

In step S1100, the CPU 501 provides the data server 100 with a notification indicating category information stored in the storage device 506 of the printing apparatus 102 and flag information indicating a request for acquiring variable data that matches the registered category information. The CPU 401 of the data server 100 refers to the "category ID" column in the variable data, and extracts the record that matches the category ID transmitted from the printing apparatus 102. Further, the data server 100 refers to the "project ID" row in the extracted record, extracts the corresponding project data, refers to the "frame data ID" in the extracted project data, and identifies the corresponding frame data. The CPU 401 of the data server 100 transmits the extracted variable data, project data, and frame data to the printing apparatus 102.

In step S1101, the CPU 501 acquires the variable data, project data, and frame data transmitted from the data server 100. In step S806 and steps S809 to S812, the CPU 501 stores the project names corresponding to the acquired variable data in the DRAM 505. Step S806 and steps S809 to S812 in FIG. 11A are similar to the corresponding steps in FIG. 8A.

If the user selects a project and selects the screen transition button 907 on the screen 904, the CPU 501 executes the processing of step S1102. In step S1102, the CPU 501 selects "not printed" variable data based on the "printed" flag in the received variable data, and displays the variable data as a list on the operation unit 507. In the second exemplary embodiment, the data server 100 determines whether the category information matches the category information registered in the printing apparatus 102. Accordingly, the processing of selecting variable data corresponding to the category information registered in the printing apparatus 102 from the received variable data like in the first exemplary embodiment is not carried out. In step S1102, a list of "not printed" variable data is displayed on the operation unit 507 of the printing apparatus 102, like the screen 920. In step S1102, if there if no "not printed" variable data, the CPU 501 displays a message indicating that there is no "not printed" variable data on the operation unit 507.

In step S1103, the CPU 501 receives a user operation and executes processing corresponding to the received user operation. In step S1103, processing to be performed in a case where data is selected and the print instruction is received and processing to be performed in a case where "edit" is selected are similar to those in the first exemplary embodiment.

If the "not printed" tab 909 is selected, the processing returns to step S1102. If the "printed" tab 910 is selected, the processing proceeds to step S1104. In step S1104, the CPU 501 refers to the "printed" flag in the variable data acquired in step S1101, selects the "printed" variable data, and displays the selected variable data on the operation unit 507. In step S1104, a screen as indicated by the screen 922 is displayed on the operation unit 507 of the printing apparatus 102. If there is no "printed" variable data in step S1104, the CPU 501 displays a message indicating that there is no "printed" variable data on the operation unit 507.

In step S1103, if the "other" tab 921 is selected, the processing proceeds to step S1106. In step S1106, the CPU 501 acquires POP data that does not match the category information registered in the printing apparatus 102 from the data server 100. The CPU 501 transmits category information registered in the data server 100 and flag information indicating a request for acquiring POP data that does not match the category information. The data server 100 refers to the category ID in the registered variable data and selects variable data with a category ID different from the received category ID. The data server 100 transmits the project data corresponding to the selected variable data and the frame data corresponding to the project data to the printing apparatus 102.

In step S1107, the CPU 501 refers to the variable data included in the received POP data, and displays an article list based on variable data corresponding to category information different from the registered category information on the operation unit 507. If the variable data that does not match the category information registered in step S1106 is not acquired, the CPU 501 displays a message indicating that the corresponding variable data is not present on the operation unit 507.

The processing to be executed by the printing apparatus 102 according to the second exemplary embodiment is described above. The above-described processing makes it possible to reduce the amount of POP data to be acquired at one time when POP data is received from the data server 100 and to reduce the time required for displaying the list of articles. Displaying the "printed" article information and the "not printed" article information separately facilitates the user to search for "not printed" articles. The selection of the "other" tab 921 makes it possible to print a POP display for articles other than the articles of the categories registered in advance.

The processing described in the first and second exemplary embodiments is executed by executing the POP print application installed in the printing apparatus 102.

The processing described in the above-described exemplary embodiments may be executed by installing the POP print application on the information processing apparatus 103 that is configured to communicate with the printing apparatus 102. In this case, in the first exemplary embodiment, the processing of steps S801 to S823 illustrated in FIGS. 8A and 8B is executed by the information processing apparatus 103. The information processing apparatus 103 transmits the combined image data to the printing apparatus 102, and the printing apparatus 102 executes the processing of step S824. The information processing apparatus 103 performs the processing of step S825 at a timing when the transmission of the combined image data is completed, or when a printing completion notification is received from the printing apparatus 102. Also, in the second exemplary embodiment, the processing of step S824 is executed in the printing apparatus 102, while the other processing is executed in the information processing apparatus 103.

Embodiments of the present disclosure can also be implemented by executing the following processing. That is, software (program) for implementing the functions according to the above-described exemplary embodiments is supplied to a system or an apparatus via a network or various storage media, and a computer (a CPU, a micro processing unit (MPU), etc.) of the system or the apparatus reads out and executes program code. In this case, embodiments of the present disclosure include the computer program and storage media storing the computer program.

As described above, in the printing system according to the exemplary embodiments of the present disclosure, the user that issues a printing instruction can save time and labor for searching for variable data to be printed in variable data registered in a data distribution server.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-010583, filed Jan. 27, 2022, which is hereby incorporated by reference herein in its entirety.

What is claimed is:

1. A printing system including a server apparatus and a printing apparatus,
wherein the server apparatus comprises:
a first controller that registers image data, a plurality of pieces of data to be combined with the image data, and categories corresponding to the plurality of pieces of data, respectively, in the server apparatus, the plurality of pieces of data including data indicating price data of a product,
wherein the first controller receives selection, by a user, of at least one category from the categories registered in the server apparatus, and
wherein the printing apparatus comprises:
a second controller that registers a category;
a communicator that receives the registered image data and the plurality of pieces of data from the server apparatus;
a display that displays, based on the category registered by the second controller, a list including the plurality of pieces of data received from the server apparatus,
wherein the second controller receives selection of data from the plurality of pieces of displayed data,
wherein the second controller receives, from the user, an instruction for changing a price of a product corresponding to the selected data, and
wherein the second controller generates print data by combining price data indicating a price changed based on the instruction with the received image data; and
a printer that prints the generated print data.

2. The printing system according to claim 1, wherein the display displays the plurality of pieces of registered data by sorting the data based on the registered category.

3. The printing system according to claim 1,
wherein the received image data includes positional information indicating a location to combine the price data, and
wherein the second controller combines, based on the positional information included in the received image data, the price data with the received image data.

4. A printing apparatus that communicates with a server apparatus configured to register image data, a plurality of pieces of data to be combined with the image data, and categories corresponding to the plurality of pieces of data, respectively, in the server apparatus, the plurality of pieces of data including data indicating price data of a product, the printing apparatus comprising:
a controller that registers a category;

a communicator that receives the registered image data and the plurality of pieces of data from the server apparatus;

a display that displays, based on the category registered by the controller, a list including the plurality of pieces of data received from the server apparatus, wherein the controller receives selection of data from the plurality of pieces of displayed data, wherein the controller receives, from the user, an instruction for changing a price of a product corresponding to the selected data, and wherein the controller generates print data by combining price data indicating a price changed based on the instruction with the received image data; and a printer that prints the generated print data.

5. The printing apparatus according to claim 4, wherein the display displays the plurality of pieces of data by sorting the data based on the registered category.

6. The printing apparatus according to claim 5, wherein the display displays the plurality of pieces of data such that the data corresponding to the registered category is located at a higher place than the other data.

7. The printing control apparatus according to claim 4, wherein the plurality of pieces of data is text data to be combined with the image data.

8. A control method for a printing apparatus that communicates with a server apparatus configured to register image data, a plurality of pieces of data to be combined with the image data, and categories corresponding to the plurality of pieces of data, respectively, in the server apparatus, the plurality of pieces of data including data indicating price data of a product, the control method comprising:

registering a category;

receiving the registered image data and the plurality of pieces of data from the server apparatus;

displaying, based on the category registered by the registering, a list including the plurality of pieces of data received from the server apparatus;

receiving, from the user, an instruction for changing a price of a product corresponding to the selected data;

generating print data by combining price data indicating a price changed based on the instruction with the received image data; and printing the generated print data.

9. A non-transitory computer readable storage medium storing a program for causing a printing apparatus that communicates with a server apparatus configured to register image data, a plurality of pieces of data to be combined with the image data, and categories corresponding to the plurality of pieces of data, respectively, in the server apparatus, the plurality of pieces of data including data indicating price data of a product, to execute a printing method, the printing method comprising:

registering a category;

receiving the registered image data and the plurality of pieces of data from the server apparatus;

displaying, based on the category registered by the registering, a list including the plurality of pieces of data received from the server apparatus;

receiving, from the user, an instruction for changing a price of a product corresponding to the selected data;

generating print data by combining price data indicating a price changed based on the instruction with the received image data; and printing the generated print data.

* * * * *